US011226890B2

(12) United States Patent
Rosa, Jr.

(10) Patent No.: US 11,226,890 B2
(45) Date of Patent: Jan. 18, 2022

(54) OPTIMAL SELECTION OF RELEVANT TESTING PARAMETERS

(71) Applicant: Red Hat, Inc., Raleigh, NC (US)

(72) Inventor: Cleber R. Rosa, Jr., Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/200,185

(22) Filed: Nov. 26, 2018

(65) Prior Publication Data
US 2020/0167269 A1    May 28, 2020

(51) Int. Cl.
    *G06F 11/36*    (2006.01)
(52) U.S. Cl.
    CPC ...... *G06F 11/3688* (2013.01); *G06F 11/3604* (2013.01); *G06F 11/3664* (2013.01)
(58) Field of Classification Search
    CPC ............. G06F 11/3606; G06F 11/3664; G06F 11/3688; G06F 11/3604
    USPC ........................................................ 717/124
    See application file for complete search history.

(56) References Cited

U.S. PATENT DOCUMENTS

| 9,703,689 | B2 | 7/2017 | Amano et al. |
| 10,061,685 | B1 | 8/2018 | White et al. |
| 2009/0199160 | A1* | 8/2009 | Vaitheeswaran et al. ................... G06F 11/3476 717/124 |
| 2011/0145795 | A1* | 6/2011 | Khanapurkar et al. ................... G06F 11/3466 717/126 |
| 2016/0179658 | A1* | 6/2016 | Avery et al. ........ G06F 11/3664 717/135 |
| 2016/0357661 | A1 | 12/2016 | Furman et al. |
| 2017/0329687 | A1 | 11/2017 | Chorley et al. |
| 2019/0163616 | A1* | 5/2019 | Govindaraju ....... G06F 11/3688 |

FOREIGN PATENT DOCUMENTS

| IN | 02713MU2013 A | 6/2015 |
| KR | 101581615 B1 | 12/2015 |

OTHER PUBLICATIONS

Author Unknown, "avocado Documentation," Release 59.0, Mar. 9, 2018, Avocado Development Team, 350 pages.
Zheng, Wei, et al., "Locating Minimal Fault Interaction in Combinatorial Testing," Advances in Software Engineering, vol. 2016, Article ID 2409521, Jan. 2016, Hindawi, 10 pages.

* cited by examiner

*Primary Examiner* — Wei Y Zhen
*Assistant Examiner* — Mohammed N Huda
(74) *Attorney, Agent, or Firm* — Withrow & Terranova, PLLC

(57) ABSTRACT

Optimal selection of relevant testing parameters is disclosed. A test parameter data structure that identifies a plurality of test parameters for use with a plurality of different test functions of a test suite is accessed, each test parameter having at least one test value. A parameter usage data structure that identifies for each respective test function a set of test parameters of the plurality of test parameters used by the respective test function is accessed. Each respective test function is initiated a number of times based at least in part on the set of test parameters used by the respective test function.

18 Claims, 8 Drawing Sheets

TEST FUNCTION 1          36-1

```
import os                                              40
from avocado_qemu import Test
from avocado.utils import cloudinit
from avocado.utils import network
from avocado.utils import vmimage
class BootLinux(Test):
    """
    Boots a Linux system, checking for a successful initialization
    :avocado: enable
    """
    timeout = 600
    def test(self):                44      42-1
        self.vm.set_machine(self.params.get('machine', default='pc'))
                                                 42-2
        self.vm.add_args('-accel', self.params.get('accel', default='kvm'))
                                                 42-3
        self.vm.add_args('-smp', self.params.get('smp', default='2'))
                                                 42-4
        self.vm.add_args('-m', self.params.get('memory', default='4096'))
                                    42-5
        arch = self.params.get('arch', default=os.uname()[4])
                                    42-6
        distro = self.params.get('distro', default='fedora')

boot = vmimage.get(distro, arch=arch,
        cache_dir=self.cache_dirs[0],
        snapshot_dir=self.workdir)
        self.vm.add_args('-drive', 'file=%s' % boot.path)
        cloudinit_iso = os.path.join(self.workdir, 'cloudinit.iso')
        phone_home_port = network.get_free_port()
        cloudinit.generate_iso(cloudinit_iso, self.name,
        phone_home_host='10.0.2.2',
        phone_home_port=phone_home_port)
        self.vm.add_args('-drive', 'file=%s' % cloudinit_iso)
        self.vm.launch()
        cloudinit.wait_for_phone_home(('0.0.0.0', phone_home_port),
        self.name)
```

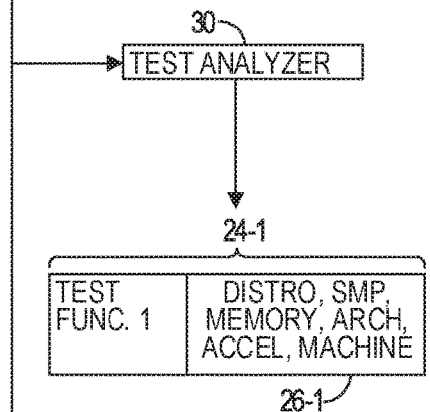

FIG. 4

TEST FUNCTION 1 LOGFILE    38-1

START 33-boot_linux.py:BootLinux.test;fedora-128-2048-x86_64-tcg-pc

TEST_CODE_HASH:

sha1=f1d2d2f924e986ac86fdf7b36c94bcdf32beec15

PARAMS (key=arch, path=*, default=None) => 'x86_64'    46-1

PARAMS (key=qemu_bin, path=*, default=/home/cleber/src/qemu/x86_64-softmmu/qemu-system-x86_64) => '/home/cleber/src/qemu/x86_64-softmmu/qemu-system-x86_64'

PARAMS (key=machine, path=*, default=pc) => 'pc'    46-2

PARAMS (key=accel, path=*, default=kvm) => 'tcg'    46-3

PARAMS (key=smp, path=*, default=2) => '128'    46-4

PARAMS (key=memory, path=*, default=4096) => '2048'    46-5

20181207 | Lecorpio IAM Solution Suite https://redhat.lecorpio.com/...-489d-b174-53a05e5bb4d2&ObjectId=c49fcf74-e5d6-4fa5-aacd-0d804eb3cf68&AddToNavigationHistory=true[9/17/2018 9:22:17 AM]

PARAMS (key=arch, path=*, default=x86_64) => 'x86_64'

PARAMS (key=distro, path=*, default=fedora) => 'fedora'    46-6

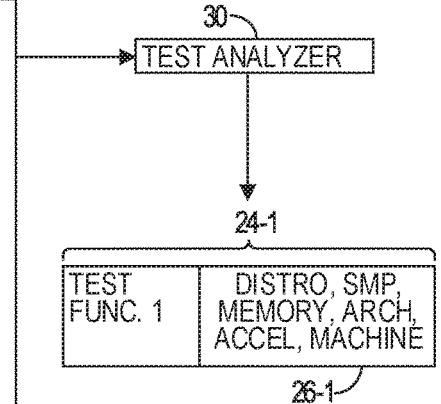

FIG. 5

OPTIMAL SELECTION OF RELEVANT TESTING PARAMETERS

TECHNICAL FIELD

The examples relate generally to the use of test parameters for testing software functions, and in particular to the optimal selection of relevant testing parameters.

BACKGROUND

Software modules are often complex and can comprise thousands or even millions of lines of code. A manufacturer of such a software module must thoroughly test even relatively small changes to the software module to ensure that the changes did not negatively affect a function of the software module. Such software modules are often tested with a test suite of test functions that can grow, over time, as the software module increases in complexity. Due to the large number of test functions in a test suite, testing such software modules can take a substantial amount of time.

SUMMARY

The examples disclosed herein relate to the optimal selection of relevant testing parameters for a test suite of functions used to test one or more software modules.

In one example a method is provided. The method includes accessing a test parameter data structure that identifies a plurality of test parameters for use with a plurality of different test functions of a test suite, each test parameter having at least one test value. The method further includes accessing, by the computing device, a parameter usage data structure that identifies for each respective test function a set of test parameters of the plurality of test parameters used by the respective test function. The method further includes initiating each respective test function a number of times based at least in part on the set of test parameters used by the respective test function.

In another example a computing device is provided. The computing device includes a memory and a processor device coupled to the memory. The processor device is to access a test parameter data structure that identifies a plurality of test parameters for use with a plurality of different test functions of a test suite, each test parameter having at least one test value. The processor device is further to access a parameter usage data structure that identifies for each respective test function a set of the plurality of test parameters used by the respective test function. The processor device is further to initiate each respective test function a number of times based at least in part on the set of the plurality of test parameters used by the respective test function.

In another example a computer program product is provided. The computer program product is stored on a non-transitory computer-readable storage medium and includes instructions configured to cause a processor device to access a test parameter data structure that identifies a plurality of test parameters for use with a plurality of different test functions of a test suite, each test parameter having at least one test value. The instructions further cause the processor device to access a parameter usage data structure that identifies for each respective test function a set of the plurality of test parameters used by the respective test function. The instructions further cause the processor device to initiate each respective test function a number of times based at least in part on the set of the plurality of test parameters used by the respective test function.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 4 is a diagram illustrating a test analyzer generating a row based on a source code file according to one example;

FIG. 5 is a diagram illustrating the test analyzer generating the row based on a logfile according to one example;

DETAILED DESCRIPTION

Figure 1:
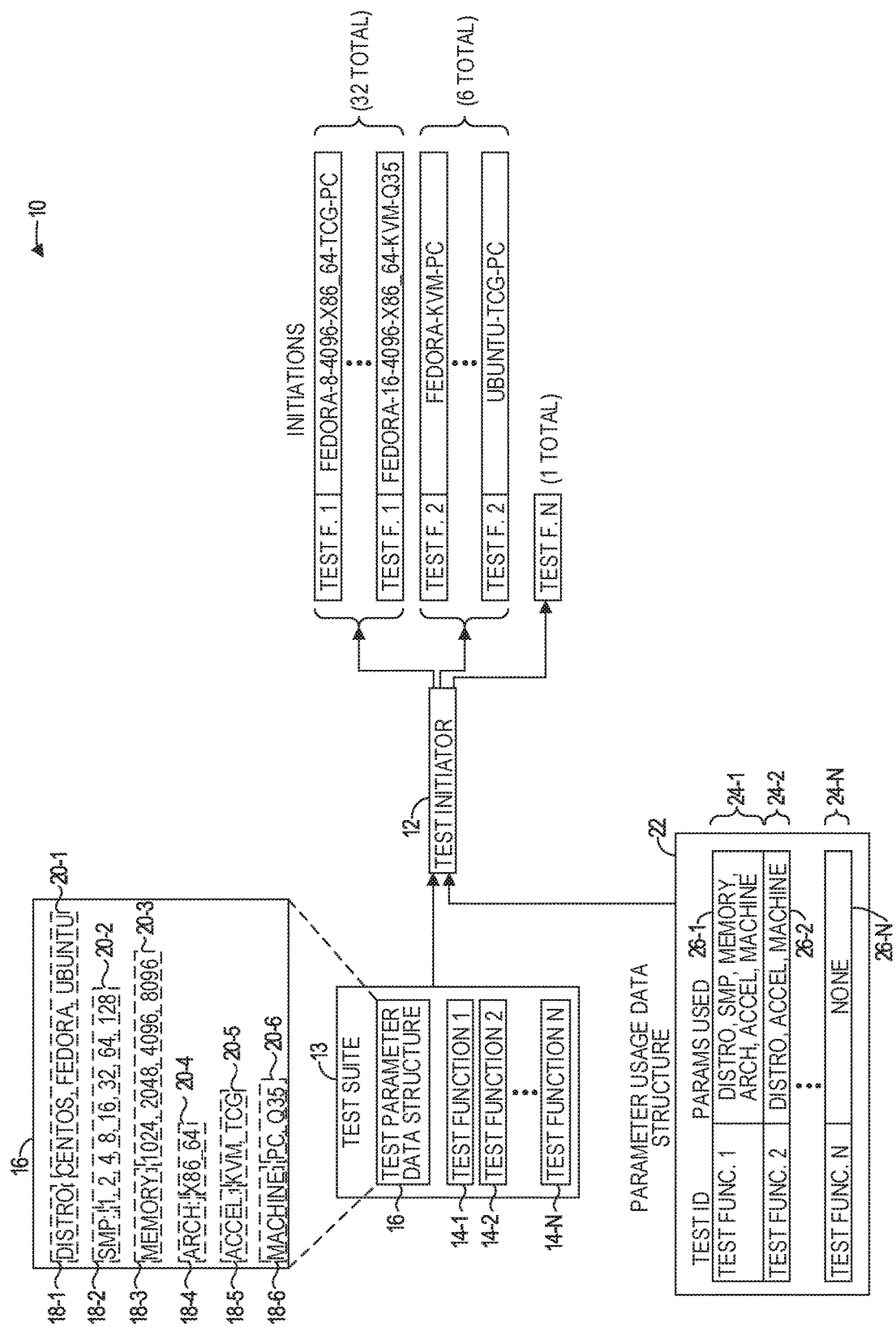
FIG. 1 is block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Software modules are often complex and can comprise thousands or even millions of lines of code. A manufacturer of such a software module must thoroughly test even relatively small changes to the software module to ensure that the changes did not negatively affect a function of the software module. Such software modules are often tested with a test suite of test functions, which can grow, over time, as the software modules increase in complexity over time. Testing such software modules can take a substantial amount of time.

It is common for an automated test initiator that initiates test functions to test a software module to be provided run-time parameters and parameter values that are used to test the software module. Such run-time parameters enable the test function to execute the same test function with different test values to thereby test different aspects of the software module. However, some of the test functions may utilize all the test parameters to test the software module; others of the test functions may utilize a subset of the test parameters to test the software module; and some test functions my not utilize the test parameters at all. Moreover, over time, as test functions themselves are rewritten, the number of test parameters they use may change over time.

As additional test functions are written and added to the test suite of test functions, and as existing test functions are revised, it becomes difficult or impractical to determine which test functions utilize which test parameters. Accordingly, to be sure that each test function adequately tests all possible combinations of test parameters and test values, the test initiator must execute each test function with the assumption that the test function utilizes all the test parameters and all the test values. For example, in a situation where a test function does not use any of the test parameters, the test function may be initiated tens or hundreds of times, depending on the number of test parameters and test values, and each execution is identical because the test function does not utilize the test parameters. This process can result in the test suite taking a substantial amount of time to complete, much of the time being unnecessary, because one or more test functions are being initiated multiple times for no benefit.

The examples disclosed herein relate to the optimal selection of relevant testing parameters for a test suite of functions used to test one or more software modules. In particular, the examples herein access a data structure that identifies for each test function those test parameters used by the respective test function. The test initiator then initiates the test function a particular number of times based on the test parameters used by the test function and the number of test values for each test parameter. Where the data structure indicates that a test function utilizes none of the test parameters, the test initiator may execute the test function one time only. Where the data structure indicates that a test function utilizes multiple test parameters, the test initiator may utilize combinatorial testing techniques, sometimes referred to as pair-wise testing when used to ensure that all different combinations of two parameters are tested, to initiate the test function an optimal number of times. By using the optimal selection of relevant testing parameters, the examples disclosed herein minimize the time it takes to test complex software modules, expediting the distribution of newly revised software modules to customers.

Among other advantages, the examples herein substantially reduce the number of executions of test functions in a test suite, without reducing the quality of the testing. The reduction in executions can substantially decrease the overall execution time of a test suite and thus expedite the distribution of new releases of products to customers. The examples can also automatically, without human involvement, identify the test parameters used by a test function to thereby ensure that the test function is initiated an optimal number of times. The examples can also automatically detect changes in parameter usage over time by a test function. Thus, the examples are an improvement to computer functionality itself. Similarly, the examples employ new data structures, and/or files that enable a test initiator to optimize parameter selection for test functions in a manner that a test initiator could not do before. The claims herein are therefore directed to a non-abstract improvement in computer functionality.

FIG. 1 is block diagram of an environment 10 in which examples may be practiced. The environment 10 includes a test initiator 12 that is configured to access a test suite 13 that includes a plurality of test functions 14-1-14-N (generally, test functions 14), that, when executed, tests a module. The module may be a software module, a hardware module, or a combination of software and hardware. The test suite 13 includes a test parameter data structure 16 that identifies test parameters and that tests values for the test parameters. In this example, the test parameter data structure 16 identifies six test parameters 18-1-18-6 (generally, test parameters 18). Each test parameter 18 has one or more corresponding test values. The test parameter 18-1 has three corresponding test values 20-1 (CENTOS, FEDORA, UBUNTU). In this example, the test parameter 18-1 relates to a particular Linux distribution, and the test values 20-1 identify different types of Linux distributions. The test parameter 18-2 has eight corresponding test values 20-2 (1, 2, 4, 8, 16, 32, 64, 128). In this example, the test parameter 18-2 relates to a particular number of processor devices, and the test values 20-2 identify eight different processor device configurations. The test parameter 18-3 has four corresponding test values 20-3 (1024, 2048, 4096, 8096). In this example, the test parameter 18-3 relates to a particular amount of memory, and the test values 20-3 identify four different memory configurations.

The test parameter 18-4 has one corresponding test value 20-4 (X86_64). In this example, the test parameter 18-4 relates to a particular processor architecture, and the test value 20-4 identifies one processor architecture. The test parameter 18-5 has two corresponding test values 20-5 (KVM, TCG). In this example, the test parameter 18-5 relates to a particular type of virtual machine code execution, and the test values 20-5 identify two different types of execution. The test parameter 18-6 has two corresponding test values 20-6 (PC, Q35). In this example, the test parameter 18-6 relates to machine types, and the test values 20-6 identify two different machine types. Generally, the test values 20-1-20-6 may be referred to herein as test values 20.

In some examples the test initiator 12 uses combinatorial testing techniques to optimize the selection of particular test values 20 in conjunction with the corresponding test parameters 18. In this example, assuming that each test function 14 utilizes all six test parameters 18, pair-wise combinatorial testing would require that the test initiator 12 initiate each test function 14 thirty-two times. However, in this example, the test initiator 12 accesses a test function parameter usage data structure 22 (hereinafter parameter usage data structure 22) that identifies for each respective test function 14 a set of the plurality of test parameters 18 used by the respective test function 14. In particular, in this example, the parameter usage data structure 22 contains a plurality of rows 24-1-24-N (generally rows, 24), each row 24 corresponding to a particular test function 14. Each row 24 identifies the set of test parameters 18 used by that particular test function 14. For example, the row 24-1 indicates that the test function 14-1 uses a set 26-1 of all six test parameters 18-1-18-6. Thus, the test initiator 12 will run the test function 14-1 a total of thirty-two times, each time with different test values 20. The row 24-2 indicates that the test function 14-2 uses a set 26-2 of three test parameters 18-1 (DISTRO), 18-5 (ACCEL) and 18-6 (MACHINE). The row 24-N indicates that the test function 14-N uses a set 26-N of no test parameters 18.

The parameter usage data structure 22 may be generated any number of ways, including, for example, by an operator knowledgeable about the use of the test parameters 18 by the test functions 14. However, as the number of test functions 14 in the test suite 13 grows over time, and as test functions 14 are revised, it can become difficult or impractical for an operator to be aware of the use of the test parameters 18 by the test functions 14. Accordingly, additional mechanisms for generating the parameter usage data structure 22 are disclosed below with regard to FIGS. 3-6.

The test initiator 12 initiates each respective test function 14 a number of times based at least in part on the particular test parameters 18 used by the respective test function 14, varying the test values 20 each time. As an example, based on the set 26-1 that indicates that the test function 14-1 uses all six test parameters 18, the test initiator 12 executes the test function 14-1 thirty-two times, each time passing in different test values 20. In the context of pair-wise testing, the number of times to initiate a test function 14 corresponds to the factor of the largest number of test values 20 for any parameter 18 and the second largest number of test values 20 for any parameter 18. In this example, the parameter 18-2 has the largest number of test values 20 (eight), and the parameter 18-3 has the second largest number of test values 20 (four). The number of initiations thus is thirty two (4×8). It will be apparent that this is merely an example of calculations that may be used in combinatorial testing techniques, and that other formulas may be used.

Based on the set 26-2 that indicates that the test function 14-2 uses three test parameters 18-1 (DISTRO), 18-5 (ACCEL), and 18-6 (MACHINE), the test initiator 12 executes the test function 14-2 six times (3×2), each time passing in different test values 20. Based on the set 26-N that indicates that the test function 14-N uses no test parameters 18, the test initiator 12 executes the test function 14-2 once, passing in no test values 20. Note that, in the absence of the parameter usage data structure 22, the test initiator 12 would initiate the test function 14-2 and the test function 14-N thirty-two times each, because the test initiator 12 would be unaware of which test parameters 18 are used by the test function 14-2 and the test function 14-N. Use of the parameter usage data structure 22 thus reduces the initiations of the test function 14-2 to six times, saving 26 needless executions of the test function 14-2. Use of the parameter usage data structure 22 reduces the initiations of the test function 14-N to one, saving 31 needless executions of the test function 14-N.

Figure 2:
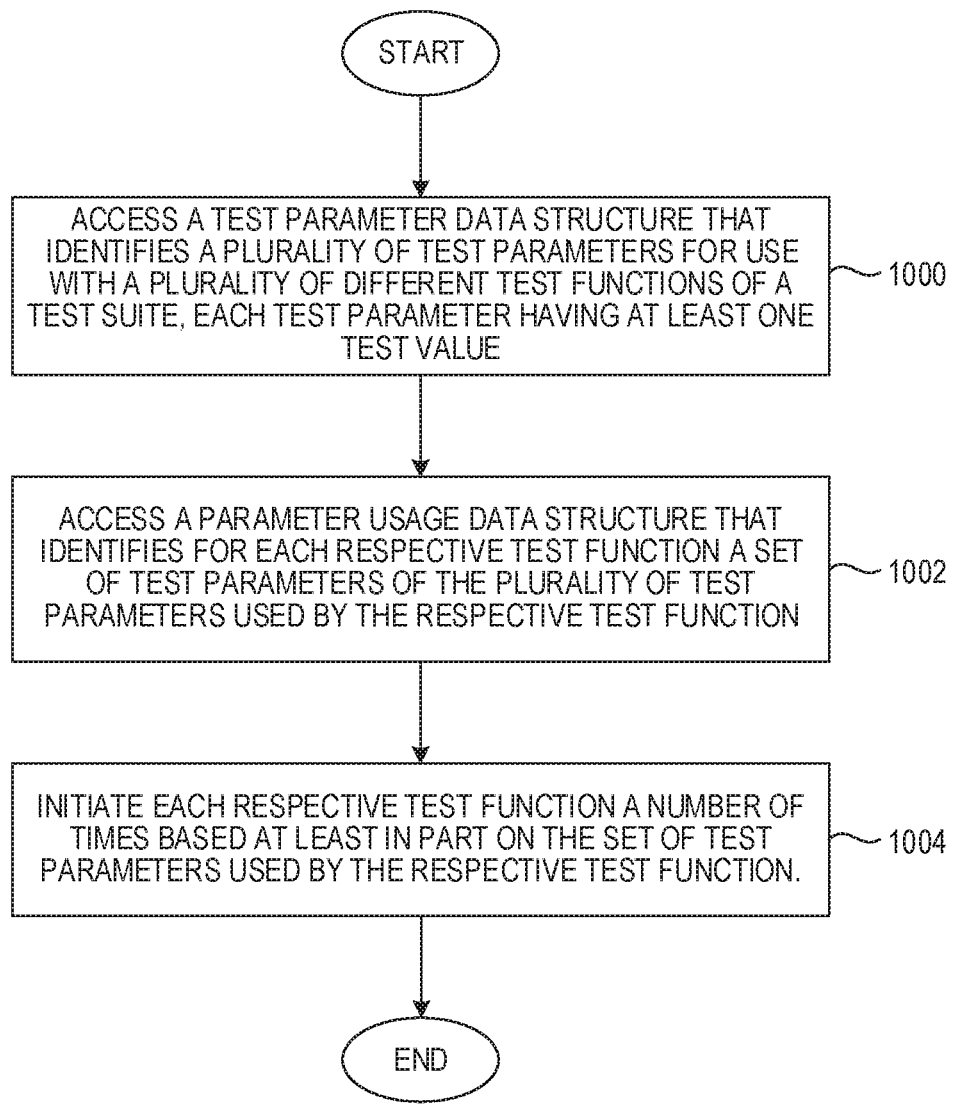
FIG. 2 is a flowchart of a method for optimal selection of relevant testing parameters according to one example.

FIG. 2 is a flowchart of a method for optimal selection of relevant testing parameters according to one example. FIG. 2 will be discussed in conjunction with FIG. 1. The test initiator 12 accesses the test parameter data structure 16 that identifies the plurality of test parameters 18 for use with the plurality of different test functions 14 of the test suite 13, each test parameter 18 having at least one test value 20 (FIG. 2, block 1000). The test initiator 12 accesses the parameter usage data structure 22 that identifies for each respective test function 14 a set 26 of the plurality of test parameters 18 used by the respective test function 14 (FIG. 2, block 1002). The test initiator 12 initiates each respective test function 14 a particular number of times based at least in part on the set 26 of the plurality of test parameters 18 used by the respective test function 14 (FIG. 2, block 1004).

Figure 3:
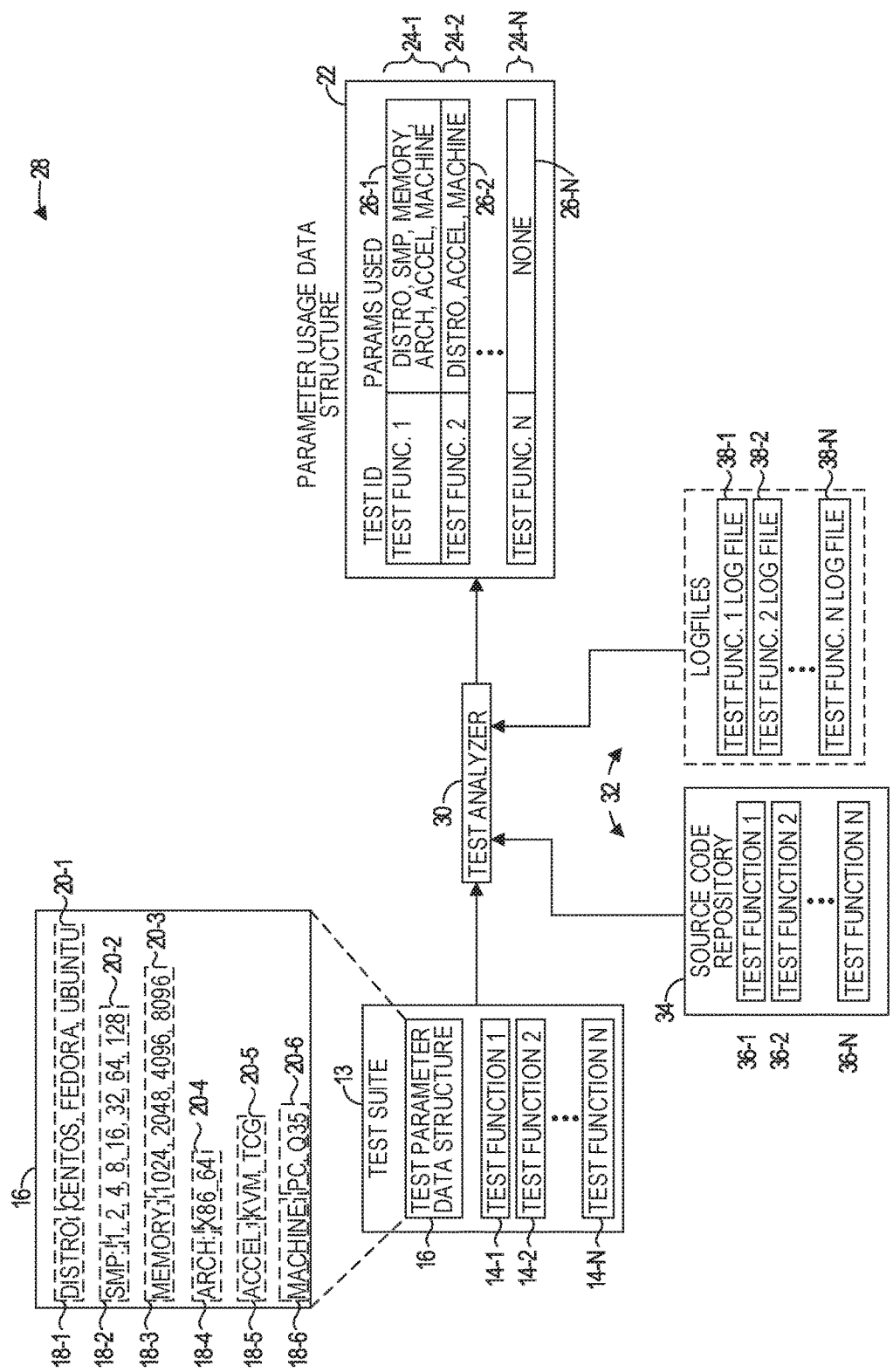
FIG. 3 illustrates an environment suitable for generating a parameter usage data structure according to one example.

FIG. 3 illustrates an environment 28 suitable for generating the parameter usage data structure 22 according to one example. In this example a test analyzer 30 may access various information 32, such as a source code repository 34 that contains source code files 36-1-36-N that correspond, respectively, to the test functions 14-1-14-N, analyze such source code files 36-1-36-N, and based on the analysis, generate the rows 24 of the parameter usage data structure 22 that includes the set 26 that identifies, for each corresponding test function 14, the plurality of test parameters 18 used by the respective test function 14. Alternatively or additionally, the information 32 may also include messages generated by each test function 14 during a previous execution of the test function 14, such as messages stored in logfiles 38-1-38-N (generally, logfiles 38). The test analyzer 30 may access the logfiles 38, analyze such logfiles 38, and based on the analysis, generate the rows 24 of the parameter usage data structure 22 that includes the set 26 that identifies, for each corresponding test function 14, the plurality of test parameters 18 used by the respective test function 14. Alternatively, the test analyzer 30 may analyze both the source code repository 34 and the logfiles 38 to generate the rows 24 of the parameter usage data structure 22.

FIG. 4 is a diagram illustrating the test analyzer 30 generating the row 24-1 based on the source code file 36-1. The test analyzer 30 accesses the source code file 36-1. The source code file 36-1 contains programming instructions 40 that define the test function 14-1. In this example the programming instructions 40 are in the Python programming language; however it will be apparent that the examples disclosed herein can be used with any programming language.

The test analyzer 30 scans and parses the source code file 36-1 to identify certain keywords. In one example, the keywords may correspond to the parameters 18. For example, the test analyzer 30 scans the source code file 36-1 and detects an occurrence 42-1 of the use of the parameter 18-6, and in response, adds the parameter 18-6 to the set 26-1. Similarly, the test analyzer 30 detects occurrences 42-2, 42-3, 42-4, 42-5 and 42-6 of the parameters 18-5, 18-2, 18-3, 18-4, and 18-1, respectively, and adds the parameters 18-5, 18-2, 18-3, 18-4, and 18-1 to the set 26-1. In some examples the test analyzer 30 may ensure that the use of the parameters 18 are in conjunction with a programming mechanism of the corresponding programming language that relates to obtaining runtime variables. For example, the test analyzer 30 may detect an occurrence 44 of the Python "get" method and then analyze the variables passed in to the "get" method (e.g., in this example "'machine', default='pc'") to determine if one of such variables is a parameter 18. In this manner, the test analyzer 30 may similarly access and analyze each source code file 36 to generate the parameter usage data structure 22. It should be noted that the test analyzer 30 may process the source code files 36 periodically, such as every day, every week, or at any other desired interval, in order to identify new source code files 36 that correspond to new test functions 14, and to identify any changes in the sets 26 due to revisions to existing test functions 14.

FIG. 5 is a diagram illustrating the test analyzer 30 generating the row 24-1 based on the logfile 38-1. In this example, assume that when the test function 14-1 executes, the test function 14-1 outputs messages that are captured in the logfile 38-1. The test analyzer 30 scans and parses the logfile 38-1 to identify certain keywords. In one example, the keywords may correspond to the parameters 18. For example, the test analyzer 30 scans the logfile 38-1 and detects an occurrence 46-1 of the use of the parameter 18-4, and in response, adds the parameter 18-4 to the set 26-1. Similarly, the test analyzer 30 detects occurrences 46-2, 46-3, 46-4, 46-5 and 46-6 of the parameters 18-6, 18-5, 18-2, 18-3, and 18-1, respectively, and adds the parameters 18-6, 18-5, 18-2, 18-3, and 18-1 to the set 26-1. As noted above with respect to the source code files 36, the test analyzer 30 may periodically process the logfiles 38, such as every day, every week, or at any other desired interval, in order to identify new logfiles 38 that correspond to new test functions 14, and to identify any changes in the sets 26 in response to changes reflected in the new logfiles 38.

Figure 6:
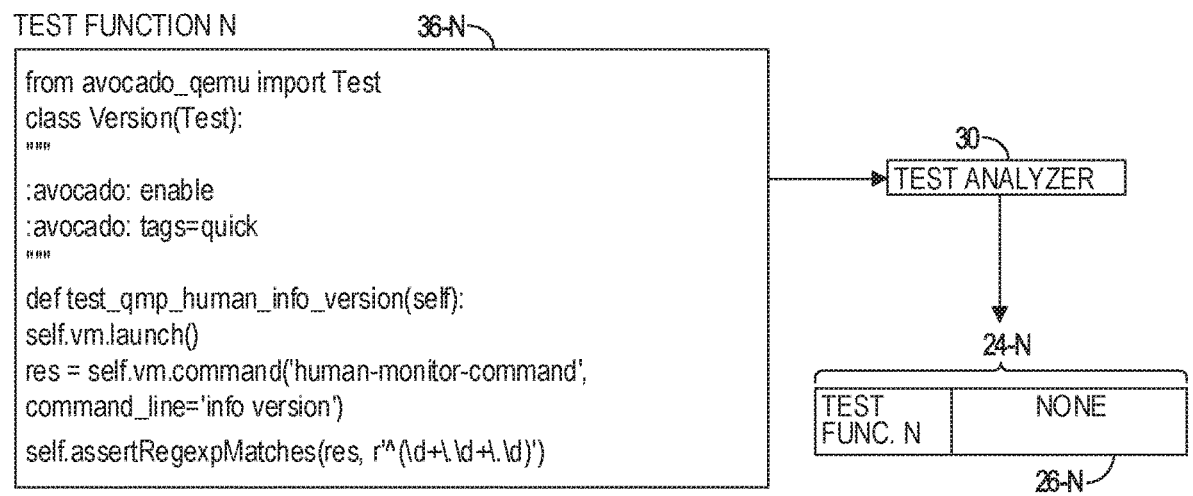
FIG. 6 is another diagram illustrating the test analyzer generating the row based on the source code file that defines a test function according to another example.

FIG. 6 is a diagram illustrating the test analyzer 30 generating the row 24-N based on the source code file 36-N that defines the test function 14-N. The test analyzer 30 scans and parses the source code file 36-N to identify certain keywords. In this example, the test analyzer 30 determines that the source code file 36-N contains none of the parameters 18, and thus generates the set 26-N that indicates that the test function 14-N does not utilize any of the parameters 18. As discussed above, this results in the test initiator 12 initiating the test function 14-N a single time rather than 32 times.

Figure 7:
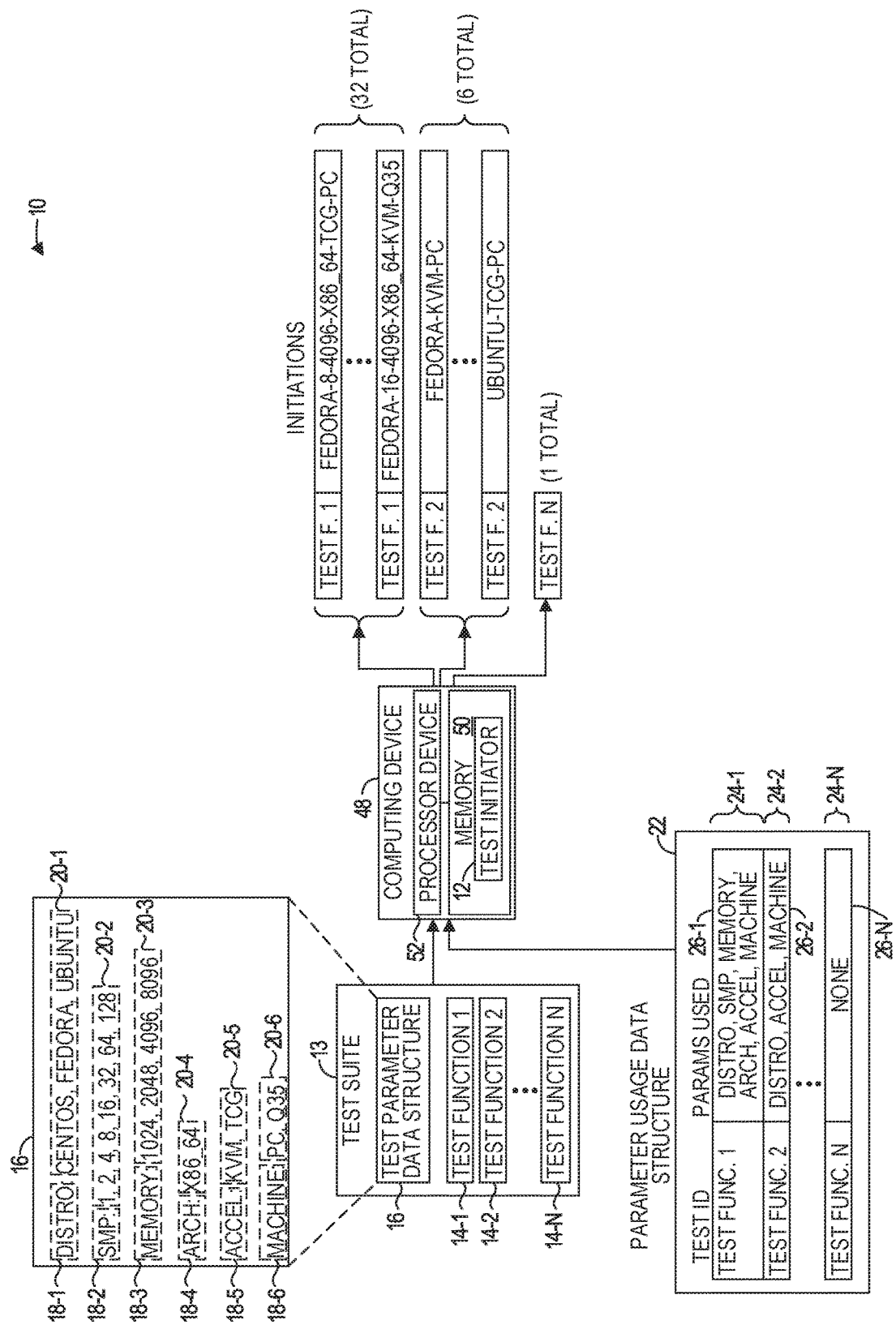
FIG. 7 is a block diagram of the environment illustrated in FIG. 1 according to another example.

FIG. 7 is a block diagram of the environment 10 according to another example. In this example the environment 10 includes a computing device 48, a memory 50, and a processor device 52 coupled to the memory 50. In this example, the test initiator 12 is a component of the computing device 48, and thus, functionality implemented by the test initiator 12 may be attributed to the computing device 48 generally. Moreover, in examples where the test initiator 12 comprises software instructions that program the processor device 52 to carry out functionality discussed herein, functionality implemented by the test initiator 12 may be attributed herein to the processor device 52. In this example, the test initiator 12 does comprise software instructions that program the processor device 52 to carry out functionality discussed herein. Thus, the processor device 52 is to access the test parameter data structure 16 that identifies the plurality of test parameters 18 for use with the plurality of different test functions 14 of the test suite 13. Each test parameter 18 has at least one test value 20. The processor device 52 is further to access the parameter usage data structure 22 that identifies for each respective test function 14 a set 26 of the plurality of test parameters 18 used by the respective test function 14. The processor device 52 is further to initiate each respective test function 14 a particular number of times based at least in part on the set 26 of the plurality of test parameters 18 used by the respective test function 14.

Figure 8:
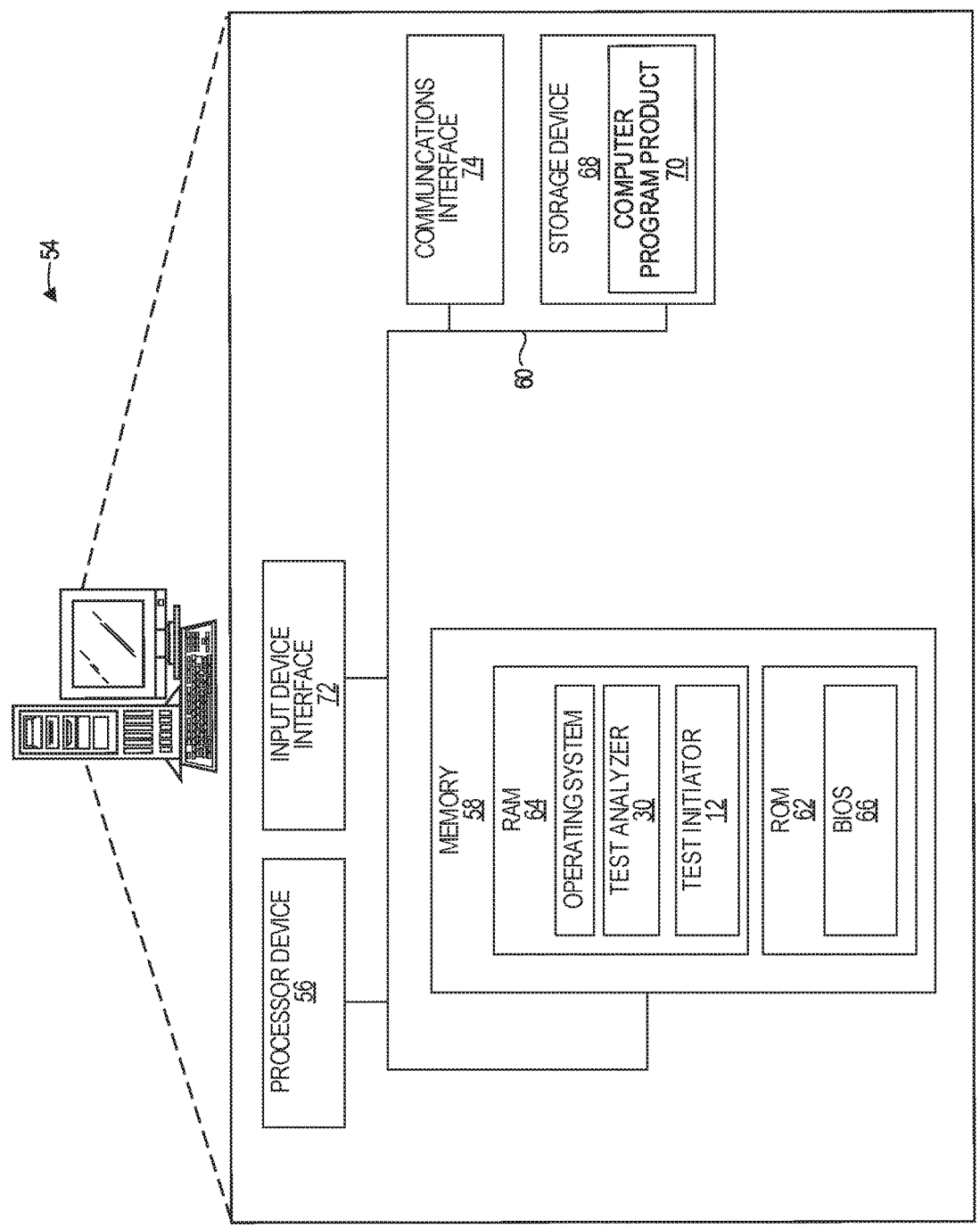
FIG. 8 is a block diagram of a computing device suitable for implementing a test initiator or a test analyzer according to one example.

FIG. 8 is a block diagram of a computing device 54 suitable for implementing the test initiator 12 or test analyzer 30. The computing device 54 may comprise any computing or electronic device capable of including firmware, hardware, and/or executing software instructions to implement the functionality described herein, such as a computer server, a desktop computing device, a laptop computing device, or the like. The computing device 54 includes a processor device 56, a system memory 58, and a system bus 60. The system bus 60 provides an interface for system components including, but not limited to, the system memory 58 and the processor device 56. The processor device 56 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The system memory 58 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the computing device 54. The volatile memory 64 may also include a high-speed RAM, such as static RAM, for caching data.

The computing device 54 may further include or be coupled to a non-transitory computer-readable storage medium such as a storage device 68, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 68 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples. The storage device 68 may store, for example, the test suite 13, the test functions 14, the parameter usage data structure 22, and the like.

A number of modules can be stored in the storage device 68 and in the volatile memory 64, including an operating system and one or more program modules, such as the test initiator 12 and/or the test analyzer 30, which may implement the functionality described herein in whole or in part.

All or a portion of the examples may be implemented as a computer program product 70 stored on a transitory or non-transitory computer-usable or computer-readable storage medium, such as the storage device 68, which includes complex programming instructions, such as complex computer-readable program code, to cause the processor device 56 to carry out the steps described herein. Thus, the computer-readable program code can comprise software instructions for implementing the functionality of the examples described herein when executed on the processor device 56. The processor device 56, in conjunction with the test initiator 12 and/or the test analyzer 30 in the volatile memory 64, may serve as a controller, or control system, for the computing device 54 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 56 through an input device interface 72 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like. The computing device 54 may also include a communications interface 74 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   obtaining, by a computing device comprising a processor device from a test parameter data structure, a plurality of test parameters for use with a plurality of different test functions of a test suite, each test parameter having at least one test value;
   obtaining, by the computing device from a parameter usage data structure that identifies, for each respective test function, a set of test parameters of the plurality of test parameters used by the respective test function;
   wherein the set of test parameters differs for at least some of the test functions; and
   for each respective test function:
      determining, based at least in part on the test parameters in the set of test parameters used by the respective test function and on a number of test values of the particular test parameters that have the two largest numbers of test values, a number of iterations to initiate the respective test function;
      initiating the respective test function a number of times equal to the number of iterations; and
      providing the respective test function a different set of test values obtained from the test parameter data structure each iteration.

2. The method of claim 1 wherein at least some of the sets of test parameters of the respective test functions consist of less than all test parameters of the plurality of test parameters.

3. The method of claim 1 further comprising:
   determining, for at least one test function of the plurality of different test functions, that the set of test parameters is an empty set; and
   based on determining that the set is an empty set, initiating the at least one test function a single time.

4. The method of claim 1 further comprising:
   determining, for a first test function of the plurality of different test functions, the set of test parameters used by the first test function, by:
      accessing information generated by the first test function during a previous execution of the first test function; and
      determining, based on the information, that the first test function uses the set of test parameters.

5. The method of claim 4 wherein determining, based on the information, that the first test function uses the set of test parameters comprises:
   scanning the information to identify the test parameters that are identified in the information.

6. The method of claim 1 further comprising:
   determining, for a first test function of the plurality of different test functions, a first set of test parameters used by the first test function, by:
      accessing programming instructions that define the first test function; and
      scanning the programming instructions to identify the parameters that are identified in the programming instructions.

7. A computing device, comprising:
   a memory; and
   a processor device coupled to the memory to:
      obtain, from a test parameter data structure, a plurality of test parameters for use with a plurality of different test functions of a test suite, each test parameter having at least one test value;
      obtain, from a parameter usage data structure that identifies, for each respective test function, a set of the plurality of test parameters used by the respective test function;
      wherein the set of test parameters differs for at least some of the test functions; and
      for each respective test function:
         determine based at least in part on the test parameters in the set of test parameters used by the respective test function and on a number of test values of the particular test parameters that have the two largest numbers of test values, a number of iterations to initiate the respective test function;
         initiate the respective test function a number of times equal to the number of iterations; and
         provide the respective test function a different set of test values obtained from the test parameter data structure each iteration.

8. The computing device of claim 7 wherein at least some of the sets of test parameters of the respective test functions consist of less than all test parameters of the plurality of test parameters.

9. The computing device of claim 7 wherein the processor device is further to:
   determine, for at least one test function of the plurality of different test functions, that the set of test parameters is an empty set; and
   based on determining that the set is an empty set, initiate the at least one test function a single time.

10. The computing device of claim 7 wherein the processor device is further to:
    determine, for a first test function of the plurality of different test functions, the set of test parameters used by the first test function, by:
       accessing information generated by the first test function during a previous execution of the first test function; and
       determining, based on the information, that the first test function uses the set of test parameters.

11. The computing device of claim 10 wherein to determine, based on the information, that the first test function uses the set of test parameters, the processor device is further to:
    scan the information to identify the test parameters that are identified in the information.

12. The computing device of claim 7 wherein the processor device is further to:
    determine, for a first test function of the plurality of different test functions, a first set of test parameters used by the first test function, by:
       accessing programming instructions that define the first test function; and
       scanning the programming instructions to identify the parameters that are identified in the programming instructions.

13. A computer program product stored on a non-transitory computer-readable storage medium and including instructions configured to cause a processor device to:
    obtain, from a test parameter data structure, a plurality of test parameters for use with a plurality of different test functions of a test suite, each test parameter having at least one test value;
    obtain, from a parameter usage data structure that identifies, for each respective test function, a set of the plurality of test parameters used by the respective test function;

wherein the set of test parameters differs for at least some of the test functions; and for each respective test function:

determine, based at least in part on the test parameters in the set of test parameters used by the respective test function and on a number of test values of the particular test parameters that have the two largest numbers of test values, a number of iterations to initiate the respective test function;

initiate the respective test function a number of times equal to the number of iterations; and provide the respective test function a different set of test values obtained from the test parameter data structure each iteration.

14. The computer program product of claim 13 wherein at least some of the sets of test parameters of the respective test functions consist of less than all test parameters of the plurality of test parameters.

15. The computer program product of claim 13 wherein the instructions further cause the processor device to:

determine, for at least one test function of the plurality of different test functions, that the set of test parameters is an empty set; and based on determining that the set is an empty set, initiate the at least one test function a single time.

16. The computer program product of claim 13 wherein the instructions further cause the processor device to:

determine, for a first test function of the plurality of different test functions, the set of test parameters used by the first test function, by:

accessing information generated by the first test function during a previous execution of the first test function; and determining, based on the information, that the first test function uses the set of test parameters.

17. The computer program product of claim 16 wherein to determine, based on the information, that the first test function uses the set of test parameters, the instructions further cause the processor device to:

scan the information to identify the test parameters that are identified in the information.

18. The computer program product of claim 13 wherein the instructions further cause the processor device to:

determine, for a first test function of the plurality of different test functions, a first set of test parameters used by the first test function, by:

accessing programming instructions that define the first test function; and scanning the programming instructions to identify the parameters that are identified in the programming instructions.

\* \* \* \* \*